Oct. 19, 1965   B. L. JONES ETAL   3,212,602
NOISE ATTENUATION APPARATUS FOR LIQUID CONDUCTING CONDUITS
Filed June 13, 1962   2 Sheets-Sheet 1
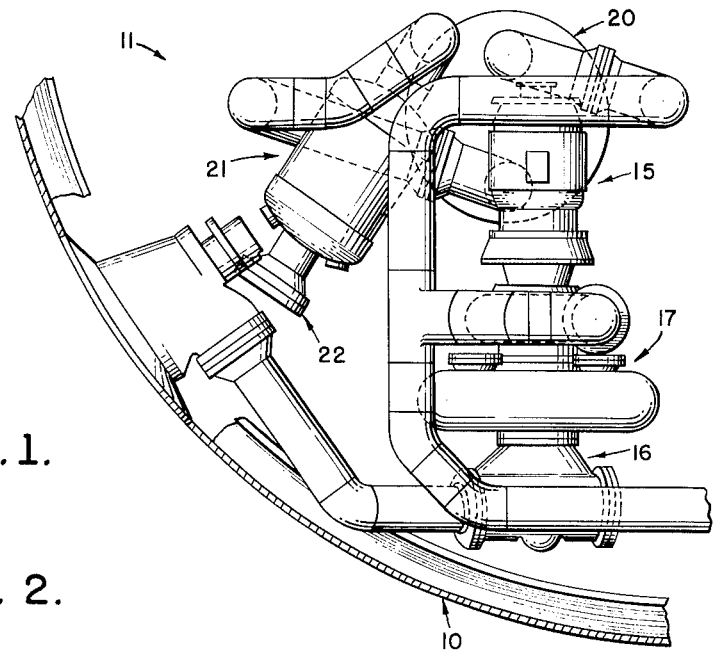
FIG. 1.
FIG. 2.
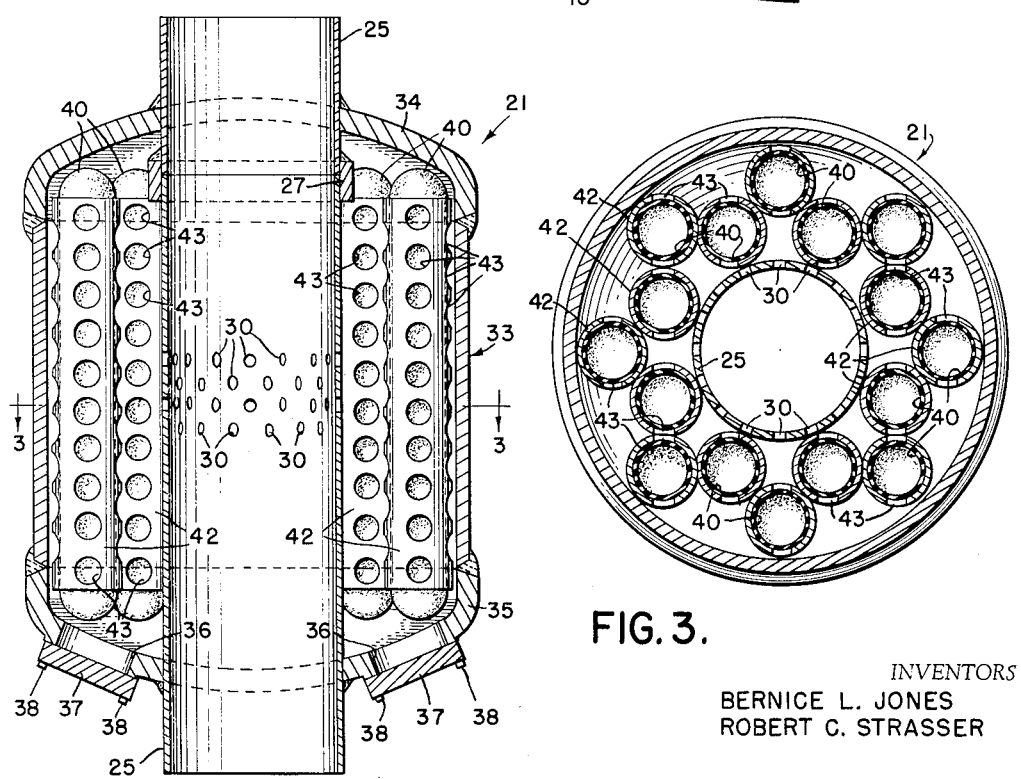
FIG. 3.
INVENTORS
BERNICE L. JONES
ROBERT C. STRASSER
BY *Shoemaker and Mattare*
ATTORNEYS

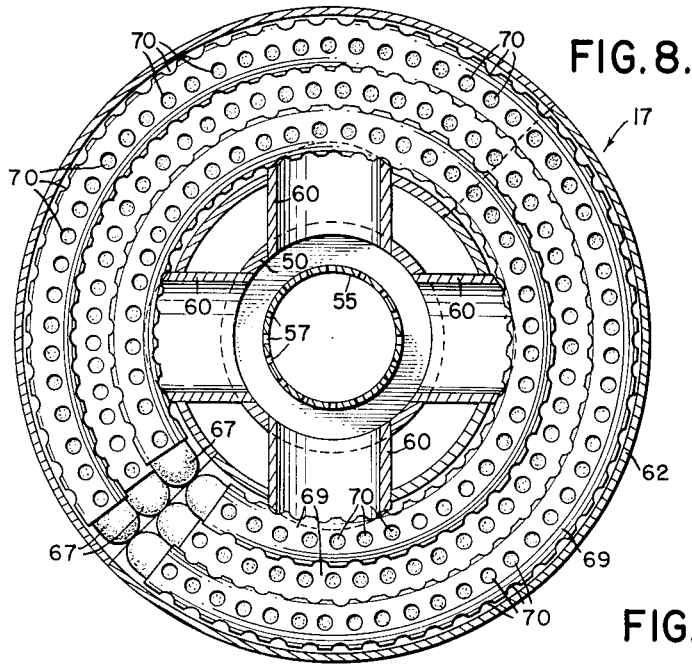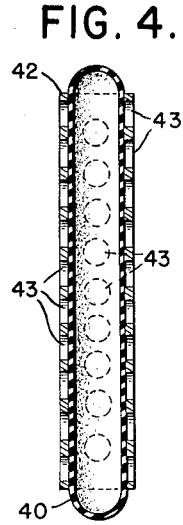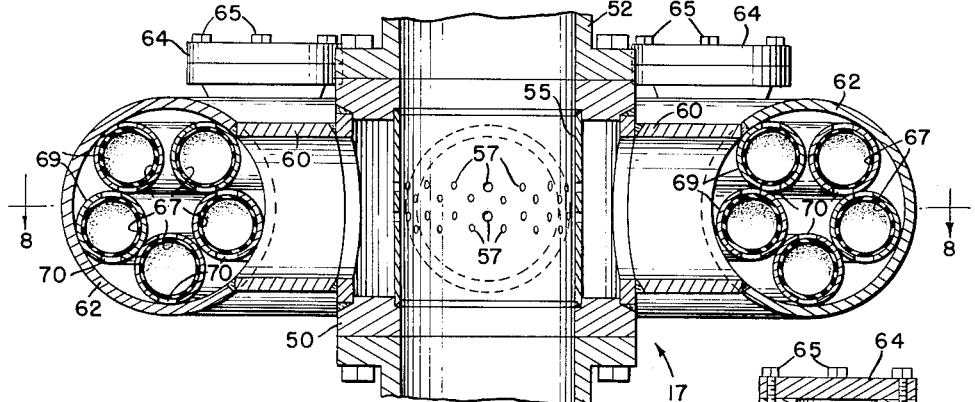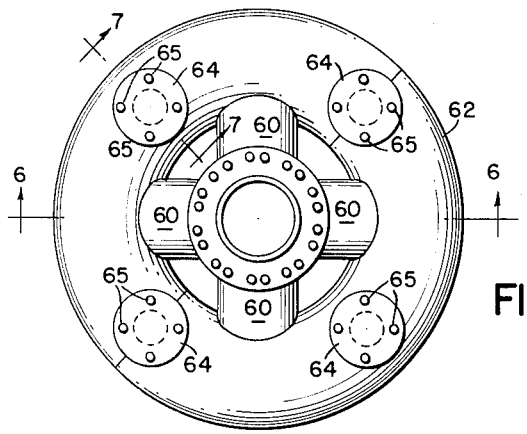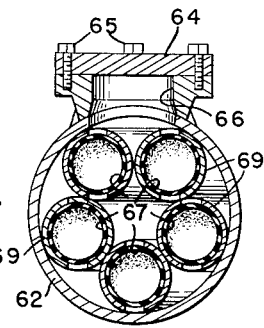

United States Patent Office 3,212,602
Patented Oct. 19, 1965

3,212,602
NOISE ATTENUATION APPARATUS FOR
LIQUID CONDUCTING CONDUITS
Bernice L. Jones and Robert C. Strasser, Newport News,
Va., assignors to Newport News Shipbuilding and Dry
Dock Company, Newport News, Va., a corporation of
Virginia
Filed June 13, 1962, Ser. No. 202,289
6 Claims. (Cl. 181—47)

The present invention relates to a new and novel noise attenuation apparatus for liquid conducting conduits and more particularly to apparatus which is especially adapted for use with a liquid conducting conduit having pumping means associated therewith for forcing the liquid through the conduit.

There are many applications in which it is desirable to suppress a pump noise or other fluid pulsations in the conduits and pipes or tanks of a liquid supply or distribution system. In a typical example, it is very desirable to reduce the noise from pumps and the like in submarines to a minimum so as to reduce the possibility of the submarine's being detected by acoustic listening apparatus. It is additionally apparent that the reduction of noise in all types of ships is a desirable feature.

The present invention for example is illustrated as utilized in a submarine, two modifications of the invention being shown, each of these noise attenuation devices being connected with the main sea water pump of the submarine. The invention is particularly adapted for use on ships or other mobile vehicles which may be subjected to considerable rolling and pitching movements, thereby drastically changing the orientation of the noise attenuation apparatus with respect to its normal operating position.

The two modifications of the present invention are shown in connection with the main sea water cooling system in a submarine, the two modifications being of a particular unique configuration so as to permit the most efficient use of the available space and providing a minimum dimension for the noise attenuation apparatus while at the same time maintaining a maximum of effectiveness in reducing noise.

The two arrangements according to the present invention have further been particularly designed to provide necessary clearance and accessibility with respect to other adjacent components.

It is important that the apparatus should not require excessive maintenance and accordingly, the present invention is specifically designed to minimize maintenance and the amount of operating attention required and further to provide a simple and inexpensive construction which is at the same time quite rugged and sturdy and reliable in operation.

The structure of the present invention incorporates attenuation apparatus which is annular in configuration and which is disposed in surrounding relationship to the liquid conducting conduit. A plurality of openings are provided through the wall of the conduit to provide communication between the interior of the conduit and the attenuation means. The openings provided in the wall of the conduit are spaced both circumferentially and longitudinally of the conduit and are substantially equally and uniformly spaced. With this arrangement, the forces transmitted by the liquid from the conduit to the attenuation means and vice versa will be substantially uniformly distributed about the stream of liquid flowing through the conduit and thereby provide maximum attenuation and efficiency. Pitching and rolling movements will have a minimum adverse effect with this symmetrical arrangement.

Additionally, the resilient means provided in the attenuation means is in the form of elongated closed hollow gas filled flexible bodies whereby the gas disposed within the bodies can not escape from the attenuation means, and further wherein the pressure within these bodies will remain at the desired level. Means is provided for readily replacing or changing these hollow bodies as required. For example, should one of the hollow bodies become ruptured for some reason or should it be desired to place a body within a device of a different pressure or a different volume so as to change the tuning of the apparatus, this can be easily accomplished.

To ensure that the hollow gas filled bodies are retained in the proper operative position and to minimize the possibility of their becoming ruptured, retainer means is provided in the form of relatively rigid means surrounding the flexible bodies, the retainer means being perforated throughout the length thereof to permit the liquid to act upon the hollow bodies throughout the length thereof.

The retainer means are provided with open end portions and are of a greater dimension than the flexible bodies to permit the flexible bodies to be readily removed and replaced when desired without the necessity of removing the retainer means.

The structural arrangement of the present invention is such that there is practically no maintenance whatsoever, since the only maintenance which may be required at any time is removal or replacement of the hollow gas filled bodies. In most instances, these gas filled bodies will last for very extended periods of time, since failure thereof due to continual flexing is not common. Of course, if it should be decided to change the gas pressure within the body means so as to alter the tuning of the device, then the various bodies must be replaced at such time, the arrangement as mentioned previously providing a simple and effective means for accomplishing this end.

An object of the present invention is to provide a new and novel noise attenuation apparatus which is especially adapted for use with liquid conducting conduits having pumping means or the like associated therewith.

Another object of the invention is the provision of noise attenuation apparatus which is particularly suited for use on ships and other mobile vehicles wherein rolling and pitching or rotary movements of the vehicle may cause major changes in the orientation of the apparatus relative to its normal operating position.

A further object of the invention is to provide noise attenuating apparatus which has a minimum size while retaining a maximum degree of effectiveness.

Still another object of the invention is to provide noise attenuation apparatus which requires a minimum of maintenance and operating attention, which is simple and inexpensive in construction, and yet which is quite sturdy and reliable in operation.

Other objects and many attendant advantages of the invention will become more apparent when considered in connection with the specification and accompanying drawings, wherein:

FIG. 1 is a somewhat schematic illustration of a portion of the main sea water cooling system of a submarine with a portion of the ship hull being shown in section and illustrating the manner in which the noise attenuation apparatus according to the present invention may be connected in such a system;

FIG. 2 is a vertical section through a first form of the invention;

FIG. 3 is a cross-sectional view taken substantially along line 3—3 of FIG. 2 looking in the direction of the arrows;

FIG. 4 is a longitudinal section through one of the hollow flexible bodies and its surrounding retainer means as shown in FIGS. 2 and 3;

FIG. 5 is a plan view of a second modification of the invention;

3

FIG. 6 is a vertical section through the apparatus shown in FIG. 5 on an enlarged scale with respect to FIG. 5 shown substantially along line 6—6 of FIG. 5 looking in the direction of the arrows;

FIG. 7 is a sectional view on an enlarged scale with respect to FIG. 5 taken substantially along line 7—7 of FIG. 5 looking in the direction of the arrows; and FIG. 8 is a sectional view on an enlarged scale with respect to FIG. 5 taken substantially along line 8—8 of FIG. 6 looking in the direction of the arrows.

Referring now to the drawings wherein like reference characters designate corresponding parts throughout the several views, there is shown in FIG. 1 the hull of a ship which is indicated generally by reference numeral 10 within which is mounted a portion of the sea water cooling system indicated generally by reference numeral 11. The main sea water pump is indicated by reference numeral 15 and a back-up valve on the suction side of the pump is indicated generally by reference numeral 16. A first form of the noise attenuation apparatus of the present invention is illustrated by reference numeral 17 and may be termed a toroid type arrangement as will hereinafter be more apparent.

The main condenser of the system is indicated by reference numeral 20, and a second form of the present invention is indicated generally by reference numeral 21, this latter noise attenuation device being connected with the discharge side of the pump, and a fitting 22 being provided for connection to a discharge back-up valve.

Referring now to FIGS. 2, 3 and 4, the construction of the apparatus indicated generally by reference numeral 21 in FIG. 1 is clearly illustrated. As seen in FIG. 2, a liquid conducting conduit 25 is provided, the lower portion of the conduit as seen in this figure being connected with the upper portion of the conduit by means of a slip joint sleeve 27 which is connected to the upper portion of the conduit by welding and the like, and which is adapted to slip over the lower portion of the conduit as seen in this figure.

Conduit 25 is provided with a plurality of openings 30 formed through the wall thereof, these openings being spaced both longitudinally and circumferentially completely around the conduit. In a typical example wherein the liquid conduit may be 14 inches in diameter, 68 holes may be provided through the wall of the conduit by providing four rows with 17 holes in each row, these holes having a diameter of ¾ inch, equally spaced around the pipe circumference with the holes of adjacent rows being staggered with respect to one another as shown.

A substantially cylindrical casing indicated generally by reference numeral 33 includes opposite end portions 34 and 35 which are welded to the conduit 25 and provide a fluid-tight seal therewith. Access openings 36 are provided in end wall 35, and covers 37 are provided for normally sealing openings 36, suitable means such as bolts 38 being provided for retaining covers 37 in operative position.

It will be noted that casing 33 defines a closed annular chamber about the outer surface of conduit 25, and holes 30 provided through the conduit open into substantially the medial portion of such chamber.

Resilient means is provided within the attenuation means, this resilient means taking the form of a plurality of elongated hollow closed gas filled flexible bodies 40, there being in a typical example 16 of such closed sealed bodies provided, and each of these bodies may have a length of approximately 34 inches and may be inflated to a pressure of 2 p.s.i. and then sealed. It is apparent that the length, cross-sectional dimension and total volume of the hollow bodies as well as the pressure of the gas therewithin may be adjusted as desired in order to obtain the required operating characteristics. It will be noted that these bodies are closed and sealed at the opposite ends thereof and may for example be formed of rubber or a similar material which is adapted to readily flex under the influence of surges within the surrounding liquid.

4

A retainer means 42 is disposed about each of the flexible hollow bodies, the various retainer means being of a similar construction and comprising a relatively stiff material such as hard rubber and the like. These retainers are open at the opposite ends thereof and are provided with a plurality of holes 43 formed therethrough, there being shown four rows of longitudinally spaced holes in each retainer means with adjacent rows being staggered with respect to one another. As can be clearly seen in FIG. 4, holes 43 are provided substantially throughout the length of the retainer means so that the retainer means is perforated throughout its length, whereby a maximum area of the associated body means is exposed to the action of the surounding liquid, while at the same time the relatively rigid retainer means will retain the shape of the body means and prevent the body means from becoming displaced within the attenuation means.

It will be noted as seen in FIGS. 2 and 4 that the opposite ends of the hollow flexible bodies extend beyond the open ends of the associated retainer means. This, of course, enables the liquid to act upon the rounded ends of the bodies and additionally enables the bodies to be readily removed from and reinserted into the associated retainers through the access openings 36 when desired.

Referring now to FIGS. 5–8 of the drawings, the toroid-type attenuation device indicated generally by reference numeral 17 in FIG. 1 is illustrated, and this modification includes a central body portion 50 to which a downwardly extending liquid conducting conduit 51 is bolted and an upwardly extending liquid conducting conduit 52 is also bolted. A cylindrical member 55 is mounted in the central hollow portion of member 50, member 55 having a plurality of holes 57 formed therethrough for providing communication between the interior of the liquid conducting conduit and the surrounding attenuation means.

Member 50 is provided with four equally spaced openings which are in communication with four radially extending cylindrical portions 60 the interiors of which define passages extending radially outwardly from the conduit and providing communication with a hollow annular casing 62 of substantially circular cross-sectional configuration. As seen especially in FIG. 5, four access covers 64 are provided, these access covers being held in place by bolts 65 and serving to normally seal underlying access openings 66 as seen in FIG. 7, through which the interior of annular casing 62 may be reached for inserting and removing hollow flexible bodies when required.

Disposed within annular casing 62 are a plurality of elongated hollow closed gas-filled flexible body means 67 shown as being five in number in the present modification, and being of a construction similar to the hollow flexible bodies 40 previously described. Each of bodies 67 is surrounded by an annular relatively rigid retainer means 69 which is constructed in a manner similar to the retainer means 42 previously described such that it is provided with a plurality of holes 70 throughout the length thereof whereby the perforated retainer means permits the liquid to act on the associated hollow flexible bodies substantially throughout the length thereof.

It will be noted that as in the previous modification, the retainer means terminates short of the ends of the associated hollow flexible body means whereby the body means can be inserted into or removed from the retainers through the access openings when required. In each of the modifications hereinabove described, liquid will normally be pumped through the liquid conducting conduit and liquid will fill the attenuation apparatus in surrounding relationship to the hollow flexible gas filled bodies therewithin.

Surges of the liquid will pass outwardly through the holes in the conduit and impinge upon the gas filled flexible bodies which will act as gas springs. By suitably adjusting the pressure of the gas in each of these bodies or by changing the volume of the bodies, the apparatus may be effectively tuned so as to cause the device to have optimum efficiency at certain predetermined pulsating frequencies.

It is apparent that the number and size of the holes and the thickness of the conduit as well as the number and size of the hollow flexible gas fillted bodies and the volume therewithin at operating pressure are all factors which enter into the tuning of the apparatus, and these various parameters may be adjusted in accordance with well known design characteristics so as to suitably tune the apparatus.

It is apparent from the foregoing that there is provided new and novel noise attenuation apparatus which is especially adapted for use with liquid conducting conduits having pumping means or the like associated therewith. The apparatus is particularly suited for use on ships and other mobile vehicles, wherein rolling and pitching or rotary movements of the vehicle may cause major changes in the orientation of the apparatus relative to its normal operating position. Since the gas is retained within closed sealed bodies, these bodies in turn being prevented from being deformed or displaced by retainer means associated with each of the body means, there is no possibility that the gas can escape into the liquid regardless of the orientation of the noise attentuation apparatus.

It will be apparent that the design of the present invention enables the apparatus to be of quite different configurations, and the device may be so designed as to occupy a minimum longitudinal dimension or a minimum lateral dimension as may be required in any particular installation.

While the dimensions of the device are minimized, the construction assures a maximum degree of effectiveness. The apparatus requires a minimum of maintenance and operating attention and is quite simple and inexpensive in construction, yet sturdy and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

We claim:

1. Noise attenuation apparatus for liquid conducting conduits comprising a liquid conducting conduit, attenuation means disposed adjacent said conduit, said conduit having a plurality of holes formed therethrough providing communication between the interior of said conduit and said attenuation means, said attenuation means including a closed cavity, resilient means disposed within said cavity, said resilient means comprising a plurality of hollow closed gas filled flexible bodies, retainer means associated with each of said bodies and comprising a relatively rigid material, each of said retainer means being disposed in surrounding relationship to the associated body and having at least one open end portion whereby the bodies may be readily inserted within the associated retainer means.

2. Apparatus as defined in claim 1, wherein said retainer means each have a plurality of spaced openings formed therethrough whereby liquid within said cavity is adapted to readily act upon the resilient bodies.

3. Noise attenuation apparatus for liquid conducting conduits comprising a liquid conducting conduit, attenuation means disposed in surrounding relationship to said conduit, said conduit having a plurality of holes formed therethrough and providing communication between the interior of said conduit and said attenuation means, said openings being spaced both longitudinally and circumferentially about said conduit, said attenuation means including a closed cavity, resilient means disposed within said cavity and comprising a plurality of elongated closed hollow gas filled flexible bodies, each of said bodies being surrounded by a relatively rigid retainer means open at opposite ends thereof, said retainer means being perforated through the length thereof whereby liquid in said cavity can readily act upon said bodies.

4. Apparatus as defined in claim 3, wherein said attenuation means includes access openings for gaining access to the interior of said cavity within the attenuation means, and means for normally closing said access openings.

5. Noise attenuation apparatus for liquid conducting conduits comprising a liquid conducting conduit, attenuation means disposed adjacent said conduit, said attenuation means including a substantially cylindrical casing spaced from said conduit and defining a substantially annular member between said casing and said conduit, said conduit having a plurality of holes formed therethrough and opening into said chamber at a point medially thereof, a plurality of elongated closed hollow gas filled flexible bodies disposed within said chamber, each of said bodies being surrounded by a relatively rigid substantially cylindrical retainer means with the opposite ends of each of said bodies projecting through open opposite ends of the associated retainer means, said retainer means being perforated throughout the length thereof such that the liquid within said chamber may readily act upon said bodies along the length thereof, said bodies and said retainer means extending substantiallly parallel with the longitudinal axis of said conduit.

6. Noise attenuation apparatus for liquid conducting conduits comprising a liquid conducting conduit, attenuation means disposed adjacent said conduit, said conduit having a plurality of holes formed therethrough for providing communication between the interior of said conduit and said attenuation means, said attenuation means comprising a substantially annular casing disposed in surrounding relationship to said conduit and including at least one passage extending radially from said conduit such that liquid passing through the holes in said conduit can pass outwardly through said radially extending passage to enter said annular casing, said annular casing being of substantially circular cross-sectional configuration and being hollow for receiving a plurality of elongated resilient closed hollow gas filled bodies, each of said bodies defining a substantially annular configuration and being surrounded by a correspondingly shaped substantially rigid retainer means, each of said retainer means terminating short of the opposite ends of the associated body and being perforated throughout the length thereof so that the liquid within said annular casing is adapted to act upon said bodies throughout the length thereof.

References Cited by the Examiner

UNITED STATES PATENTS

| 1,721,846 | 7/29 | Atzberger | 138—27 X |
| 2,051,019 | 8/36 | Arutunoff | 181—47 |
| 2,530,190 | 11/50 | Carver | 138—26 |
| 3,035,613 | 5/62 | Beatty | 138—30 |

FOREIGN PATENTS

| 48,783 | 3/38 | France. |
| 719,578 | 11/31 | France. |
| 558,021 | 6/33 | Germany. |
| 3,500 | 1893 | Great Britain. |

LEO SMILOW, *Primary Examiner.*